United States Patent
Mehta et al.

(10) Patent No.: US 10,246,973 B2
(45) Date of Patent: Apr. 2, 2019

(54) DOWNHOLE ENERGY HARVESTING DEVICE

(71) Applicant: Halliburton Energy Services, Inc., Houston, TX (US)

(72) Inventors: Krunal Kanubhai Mehta, Singapore (SG); Ragi Lohidakshan Poyyara, Pune (IN); Richard T. Hay, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 27 days.

(21) Appl. No.: 15/532,042

(22) PCT Filed: Apr. 19, 2016

(86) PCT No.: PCT/US2016/028296
§ 371 (c)(1),
(2) Date: May 31, 2017

(87) PCT Pub. No.: WO2017/184124
PCT Pub. Date: Oct. 26, 2017

(65) Prior Publication Data
US 2018/0187520 A1  Jul. 5, 2018

(51) Int. Cl.
*E21B 41/00* (2006.01)
*H02K 7/18* (2006.01)
(Continued)

(52) U.S. Cl.
CPC ....... *E21B 41/0085* (2013.01); *H02K 7/1823* (2013.01); *H02N 2/18* (2013.01); *E21B 47/00* (2013.01)

(58) Field of Classification Search
CPC .... E21B 41/0089; E21B 47/00; H02K 7/1823
See application file for complete search history.

(56) References Cited

U.S. PATENT DOCUMENTS

| 8,033,328 | B2 | 10/2011 | Hall et al. | |
| 8,514,657 | B2 * | 8/2013 | Sitka | E21B 47/185 340/854.3 |

(Continued)

FOREIGN PATENT DOCUMENTS

| WO | 2014100267 A1 | 6/2014 |
| WO | 2015076851 A1 | 5/2015 |
| WO | 2015116116 A1 | 8/2015 |

OTHER PUBLICATIONS

Kowalczyk, Mariusz, Andrea Vezzini, and Lech Grzesiak. "Pseudo-direct drive for aerial applications." ratio 2 (2013): 6.
(Continued)

*Primary Examiner* — D. Andrews
*Assistant Examiner* — Yanick A Akaragwe
(74) *Attorney, Agent, or Firm* — McGuireWoods LLP

(57) ABSTRACT

The disclosed embodiments include energy harvesting devices, methods to operate the energy harvesting devices, and downhole power generating systems. In one embodiment, an energy harvesting device includes an outer stator having a first cavity formed therein. The energy harvesting device further includes a rotor disposed within the first cavity, the rotor including a second cavity, at least one radial slot, and a helical slot extending from a first end of the rotor towards a second end of the rotor. The energy harvesting device further includes an inner stator disposed within the second cavity. The energy harvesting device further includes an armature adjacent to the rotor, the armature coupled to at least one winding coupled to an electrical component to provide an electrical current to power the electrical component. The energy harvesting device further includes a housing coupled to the outer stator.

15 Claims, 5 Drawing Sheets

(51) Int. Cl.
   *H02N 2/18*    (2006.01)
   *E21B 47/00*   (2012.01)

(56) References Cited

U.S. PATENT DOCUMENTS

| | | |
|---|---|---|
| 2002/0162654 A1 | 11/2002 | Bauer et al. |
| 2004/0140726 A1* | 7/2004 | Spring ................. E21B 4/04 310/166 |
| 2010/0001529 A1 | 1/2010 | Rosefsky |
| 2011/0042965 A1 | 2/2011 | Atallah et al. |
| 2015/0211481 A1* | 7/2015 | Mehta .................. F04C 18/045 418/1 |

OTHER PUBLICATIONS

International Search Report and Written Opinion dated Jan. 16, 2017; International PCT Application No. PCT/US2016/028296.

* cited by examiner

DOWNHOLE ENERGY HARVESTING DEVICE

BACKGROUND

The present disclosure relates generally to energy harvesting devices and methods to operate downhole energy harvesting devices.

Downhole sensors and instruments used in logging while drilling (LWD) and measurement while drilling (MWD) systems are often powered by power supplies, such as lithium batteries. However, power supplies store a finite amount of charges and are periodically replaced or recharged. Given that the batteries are located proximate to the sensors and instruments, which are often several thousand feet downhole, the process to replace or recharge batteries is time consuming and tedious.

Further, downhole environments in which power supplies operate are often unstable. As such, power supplies are often subject to heat, pressure, dampness, friction, as well as other adverse conditions that negatively impact the efficiency and operability of the power supplies.

BRIEF DESCRIPTION OF THE DRAWINGS

Illustrative embodiments of the present disclosure are described in detail below with reference to the attached drawing figures, which are incorporated by reference herein, and wherein.

Figure 1:
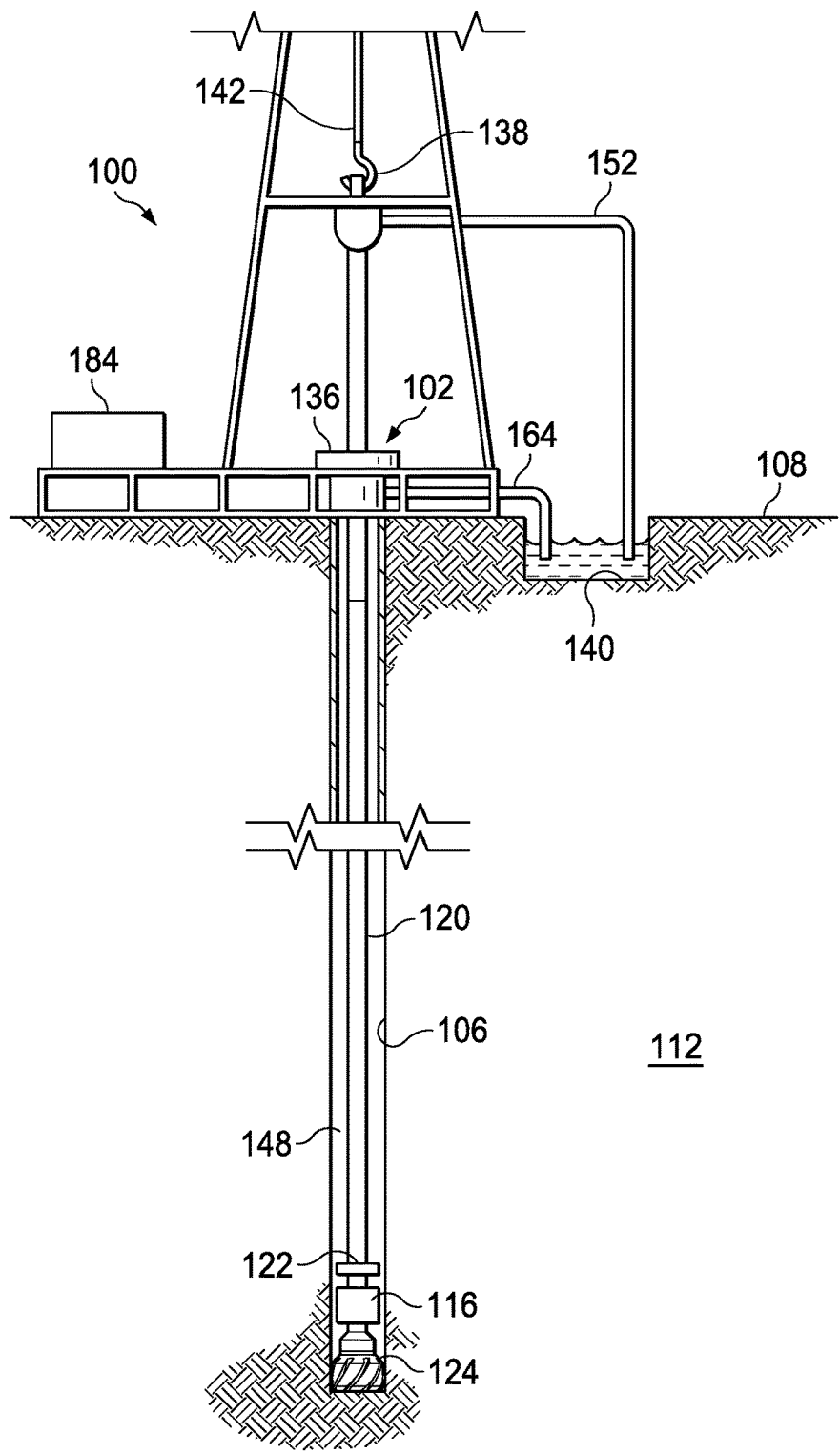
FIG. 1 is a schematic, side view of a LWD environment with an energy harvesting device deployed to power nearby electrical components.

The illustrated figures are only exemplary and are not intended to assert or imply any limitation with regard to the environment, architecture, design, or process in which different embodiments may be implemented.

DETAILED DESCRIPTION

The present disclosure relates to energy harvesting devices, methods to operate a downhole energy harvesting device, and downhole power generating systems. More particularly, this disclosure relates to an energy harvesting device that is deployable in a downhole environment to harvest energy from fluid flow through the well for the purpose of providing power to a nearby electrically-powered system. The energy harvesting device includes a stator having a cylindrical cavity formed within the stator, and a housing coupled to the stator. The energy harvesting device also includes a rotor disposed within the cylindrical cavity. The rotor includes at least one radial slot and a helical slot extending from a first end of the rotor towards a second end of the rotor. The energy harvesting device further includes an armature adjacent to the rotor. The armature includes at least one winding coupled to an electrical component to provide an electrical current to power the electrical component. The energy harvesting device translates hydro-mechanical forces exerted upon the rotor into electrical energy to power one or more electrical components such as, but not limited to sensors and instruments used in LWD or MWD operations. In an embodiment, the electrical component that receives the electrical energy may be a battery or power supply, which is in turn coupled to an LWD tool, an MWD tool, or another downhole tool.

In LWD and MWD operations, such energy harvesting devices may be deployed proximate to one or more electrical components used in the LWD or MWD operations. For example, an energy harvesting device may be deployed on a tool string (e.g., a drill string or other tool strings), and proximate to the one or more electrical components used in a LWD or MWD operation. The energy harvesting device includes a stator that has a cylindrical cavity and a housing coupled to the stator. A rotor having an internal cavity and a helical slot that extends from a first end of the rotor towards a second end of the rotor is disposed within the stator. When fluids are pumped from the surface into the tool string, the fluids flow through both the cavities of the stator and the rotor. The fluids exert a force onto the rotor that causes the rotor to nutate such that the longitudinal axis of the rotor rotates about a longitudinal axis of the stator. As used herein, "nutate," "nutating," and "nutation" are defined to mean either a rotation motion and a rocking, swaying, or nodding motion along a longitudinal axis, or a rotation motion without a rocking, swaying, or nodding motion along the longitudinal axis. With respect to the rotor described herein, nutation may be exhibited by the rotor axis rotating about the stator axis.

In some embodiments, the rotor is rotatably connected to an armature such that nutation of the rotor causes the armature to rotate about the longitudinal axis of the stator. In such embodiments, the armature is disposed within the housing and is coupled to multiple windings manufactured from materials such as copper, aluminum, or other materials that may enhance electrical efficiencies due to electrical conductivity. Further, the housing includes a plurality of magnetic members spaced across the interior of the housing. The magnetic members generate a magnetic flux, which intersects the windings of the armature to generate a secondary electrical current within the windings that can be harvested to supply electrical power.

In some embodiments, the rotor is rotatably connected to a magnetic gearing such that nutation of the rotator causes the magnetic gearing to rotate about the longitudinal axis of the stator. In such embodiments, the armature is stationary and is coupled to the housing. The magnetic gearing includes a plurality of magnetic members spaced across a surface of the magnetic gearing. When the magnetic gearing rotates, the magnetic members generate a revolving magnetic flux that intersects windings of the armature to generate a secondary electrical current within the windings. The generated electrical current is then transferred to one or more electrical components to power the one or more electrical components.

Turning now to the figures, FIG. 1 is a schematic, side view of a LWD environment 100 with an energy harvesting device 116 deployed to power nearby electrical components 122. FIG. 1 may also represent a MWD environment or another production or preparation environment where downhole electrical components are utilized. In the embodiment of FIG. 1, a well 102 having a wellbore 106 extends from a surface 108 of the well 102 to or through a subterranean formation 112. A hook 138, cable 142, traveling block (not shown), and hoist (not shown) are provided to lower a tool string 120 down the wellbore 106 or to lift the tool string 120 up from the wellbore 106. The tool string 120 may be a wirelines tool string, a slickline tool string, a drill string, or another type of tool string operable to deploy the energy harvesting device 116.

At wellhead 136, an inlet conduit 152 is coupled to a fluid source (not shown) to provide fluids, such as drilling fluids, downhole. The tool string 120 has an internal cavity that provides a fluid flow path from the surface 108 down to the energy harvesting device 116. The tool string 120 is coupled to the energy harvesting device 116 and is fitted with electrical components 122 which may include, without limitation, sensors and instruments operable to make one or more types of downhole measurements, as well as batteries or other types of power supplies operable to store electrical energy for subsequent transmission to instruments, sensors, tools, and other electrically-powered equipment. The fluids travel down the tool string 120, through the energy harvesting device 116, and exit the tool string 120 at the drill bit 124. The fluids flow back towards the surface 108 through a wellbore annulus 148 and exit the wellbore annulus 148 via an outlet conduit 164 where the fluids are captured in a container 140. The energy harvesting device 116 is operable to convert kinetic energy resulting from hydraulic forces applied to the aforementioned drilling fluids, and in turn a rotor component of the energy harvesting device 116, into electrical current. The energy harvesting device 116 provides the generated electrical current to the electrical components 122 to power the electrical components 122. Additional descriptions of the energy harvesting device 116 are described in the following paragraphs and are illustrated in at least FIGS. 2-5. Measurements made by the electrical components 122 are monitored by controller 184.

In some embodiments, the amount of generated electrical current is partially based on a flow rate of the fluid through the energy harvesting device. In other embodiments the amount of generated electrical current is based on a configuration of the magnetic members of the energy harvesting device. In further embodiments, the amount of generated electrical current is based on materials used to manufacture the magnetic members or the windings. In a further embodiment, the amount of generated electrical power is based on the number of windings or magnetic members disposed within the energy harvesting device. In further embodiments the amount of generated electrical current is based on a combination of the foregoing factors.

Figure 2:
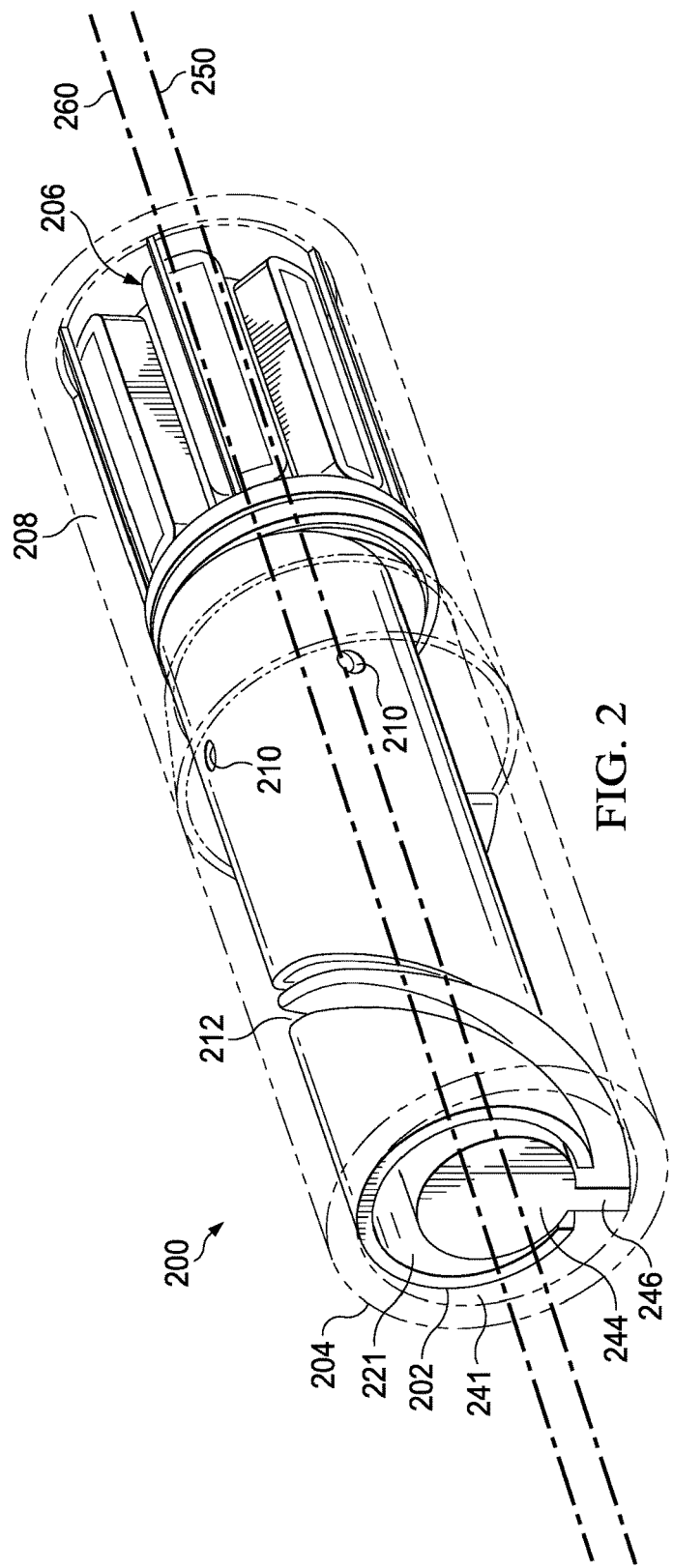
FIG. 2 is a schematic, perspective view of an example of an energy harvesting device having a nutating rotor coupled to an armature and deployable in the environment of FIG. 1.

FIG. 2 is a schematic, perspective view of an example of an energy harvesting device 200 having a rotor 202 coupled to an armature 206 and deployed in the environment 100 of FIG. 1. In the embodiment illustrated in FIG. 2, the energy harvesting device 200 includes an outer stator 204 having a first end that is coupled to a tool string, (e.g., the tool string 120 of FIG. 1), a second end that is coupled to a housing 208, and a first cavity 241 extending from the first end to the second end of the outer stator 204. The housing 208 may be coupled to a downhole portion of the tool string. The rotor 202 is disposed within the first cavity of the outer stator 204 and includes a second cavity. An inner stator 244 having a solid interior is disposed within the second cavity 221 of the rotor 202. In some embodiments, the inner stator 244 and the outer stator 204 are connected by a helical guide 246. The inner cavity 221 provides a conduit for fluids to continue to flow from the tool string 120 through the outer stator 204 and the housing 208. Further, the rotor 202 has a longitudinal rotor axis 260 that is parallel and offset from a longitudinal stator axis 250. The rotor 202 includes a helical slot 212 that extends from a first end of the rotor 202 towards a second end of the rotor 202. The rotor 202 also includes radial slots 210 configured to allow drilling fluids in the outer cavity 241 to enter the rotor 202 to flow toward the armature 206. In some embodiments, the flow area of radial slots 210 approximately equals to the flow area of the outer cavity 241.

Figure 3:
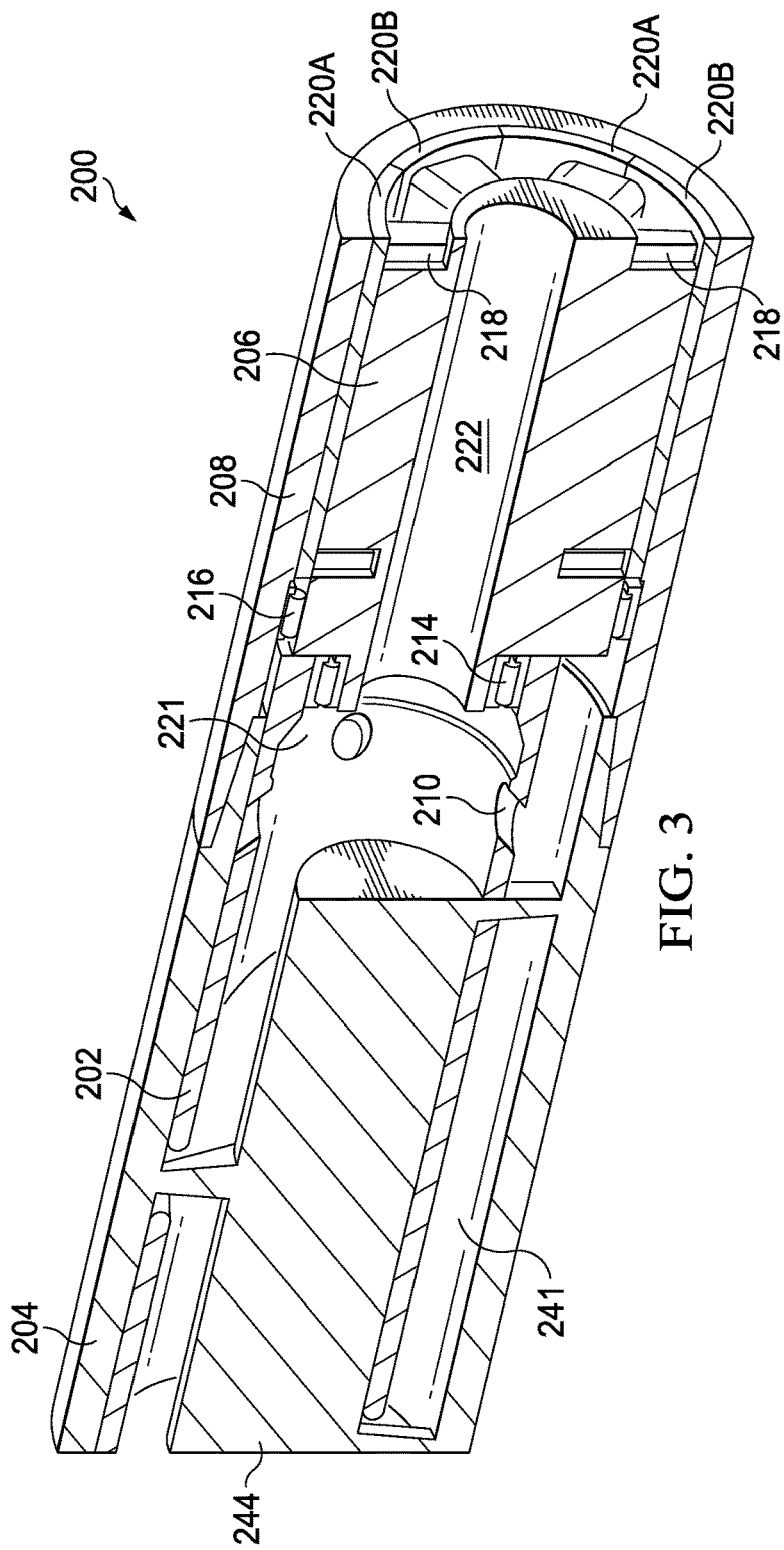
FIG. 3 is a schematic, sectional view of an embodiment of the energy harvesting device FIG. 2.

In the embodiment illustrated in FIG. 3, the housing 208 includes magnetic members 220A and 220B that are aligned around an internal surface of the housing 208. In some embodiments, the magnetic members 220A and 220B have opposite polarities and are aligned adjacent to each other. In such embodiments, each magnetic member 220A is disposed adjacent to two magnetic members 220B having an opposite polarity, and vice versa.

The rotor 202 is fixed relative to the armature 206 such that the rotor 202 is free to nutate between the outer stator 204 and the inner stator 244, and such that the armature 206 is free to rotate within the housing 208. The armature 206 includes a first bearing 214, a second bearing 216, and windings 218 that are wound around an external surface of the armature 216. The second bearing 216 is coupled to the housing 208 to allow rotational freedom and to prevent fluids from contacting the windings 218 or the magnetic members 220A and 220B, thereby damaging the windings or the magnetic members 220A and 220B. The first bearing 214 is coupled to the rotor 202 to fluidly couple the inner cavity 221 to an armature cavity 222, which provides a fluid flow path through the armature 206. The first bearing 214 also allows the rotor 202 to transfer kinetic energy generated by fluids flowing through the rotor 202 to the armature 206. This kinetic energy is convertible to electrical energy at the armature 206, where the rotating windings 218 intersect magnetic flux generated by the magnetic members 220A and 220B. The generated electrical current is provided to electrical components 122 to power the electrical components 122.

Figure 4:
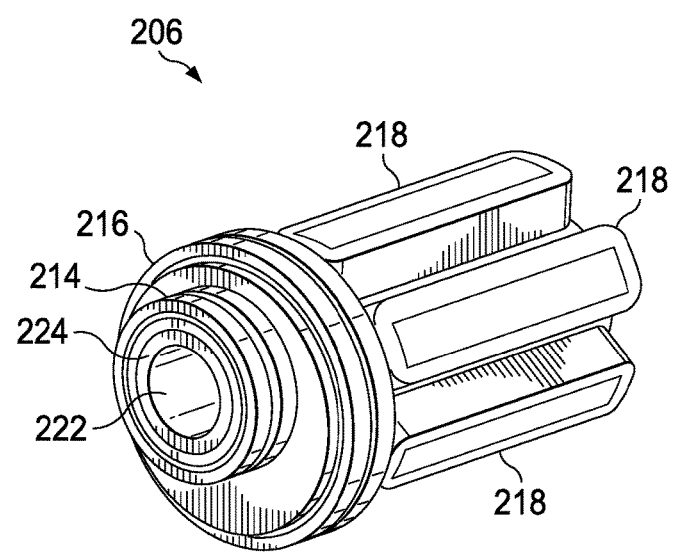
FIG. 4 is a schematic, perspective view of an armature of the energy harvesting device of FIG. 2.

FIG. 4 is a schematic, perspective view of an armature 206 of the energy harvesting device 200 of FIG. 2. In the embodiment illustrated in FIG. 4, the armature 206 includes an eccentric cylindrical boss 224 that extends for one end of the armature 206. The eccentric cylindrical boss 224 and the first bearing 214 are coupled to the rotor 202 to convert a nutating motion of the rotor 202 to a rotating motion of the armature 206. The armature 206 includes a cavity 222 that is concentric with the eccentric cylindrical boss 224. Further, the armature cavity 222 extends from the eccentric cylindrical boss 224 through the armature 206 to provide a fluid flow path through the armature 206. In the embodiment illustrated in FIG. 4, windings are wound around six protruding members of the armature 206. In other embodiments, the windings may be wound around a different number of protruding members or may be wound in different configurations.

Figure 5:
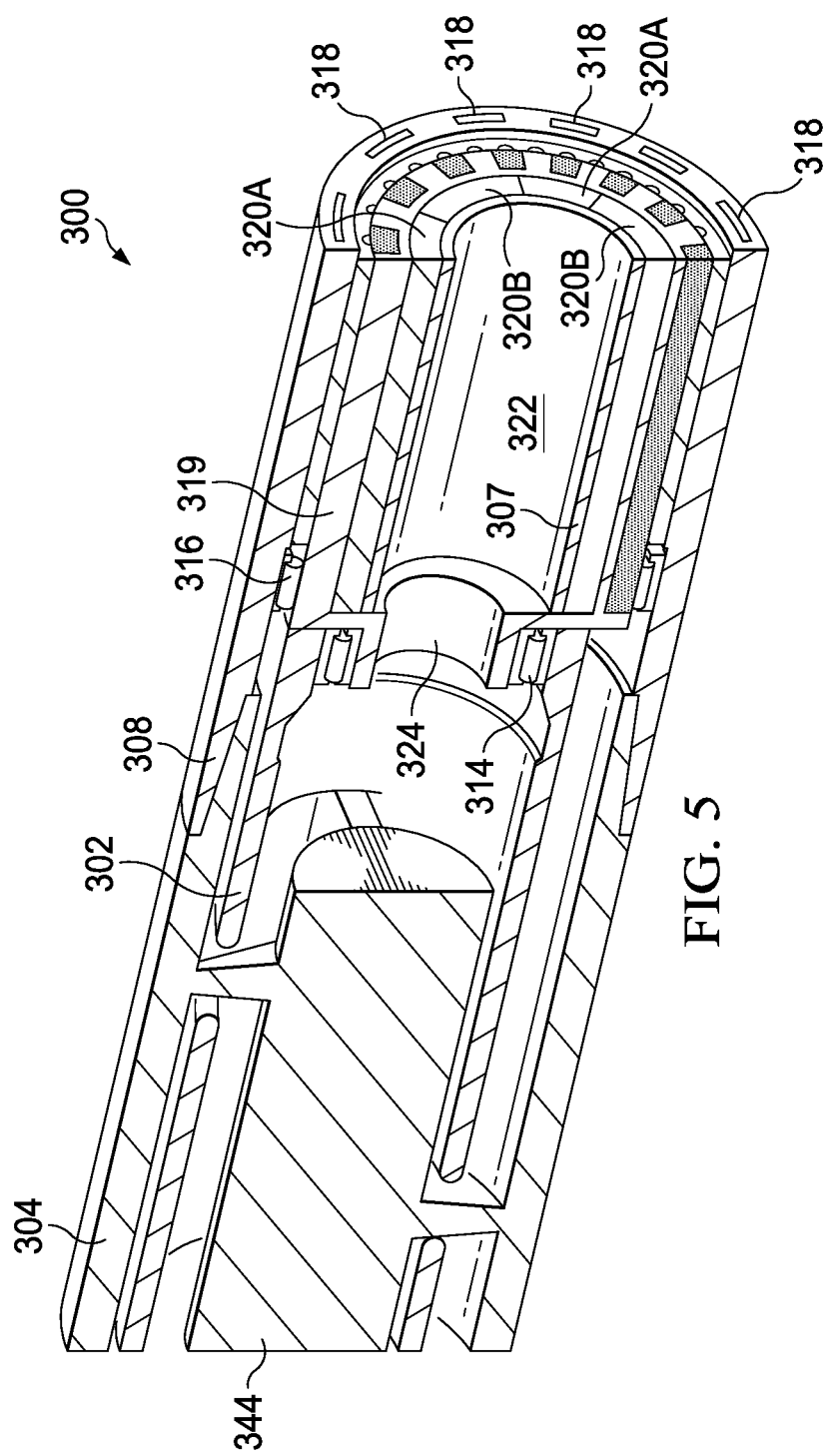
FIG. 5 is a schematic, sectional view of another example of the energy harvesting device having a nutating rotor coupled to a magnetic gearing and deployed in the environment of FIG. 1.

FIG. 5 is a schematic, sectional view of another example of the energy harvesting device 300 having a nutating rotor 302 coupled to a magnetic gearing 307 and deployable in the environment 100 of FIG. 1. The outer stator 304, the inner stator 344, and the rotor 302 components of the energy harvesting device 300 illustrated in FIG. 5 are identical to the outer stator 204, inner stator 244, and rotor 202 of the energy harvesting device 200 illustrated in FIG. 3. The outer stator 304 is coupled to a housing 308, which functions as a stationary armature and is coupled to windings 318. Further, the rotor 302 is coupled to an eccentric cylindrical boss 324 and a first bearing 314 of the magnetic gearing 307. This coupling rotatably couples the magnetic gearing 307 to an end of the rotor 302 and to translate a nutating motion of the rotor 302 to a rotating motion of the magnetic gearing 307 about the longitudinal stator axis 250. Further, the first bearing 314 connects the rotor to a cavity 322 to provide a fluid flow path through the magnetic gearing 307.

The magnetic gearing 307 includes a plurality of magnetic members 320A and 320B aligned around a surface of the magnetic gearing 307. In some embodiments, magnetic members 320A and 320B have opposite polarities and are disposed adjacent to each other. In such embodiments, each magnetic member 320A or 320B is disposed adjacent to two magnetic members having an opposite polarity. The magnetic gearing 307 further includes an intermediate sleeve 319 surrounding the magnetic members 320A and 320B to insulate the magnetic members 320A and 320B from other components of the energy harvesting device 300. The magnetic gearing 307 further includes a second bearing 316, which is coupled to the housing 308 to prevent fluids from contacting the windings 319 or the magnetic members 320A and 320B, thereby damaging the windings 319 or the magnetic members 320A and 320B. As the magnetic gearing 307 rotates, the magnetic members 320A and 320B generate a revolving magnetic flux that intersects the stationary windings 318 and generates an electrical current in the stationary windings 318. The electrical current is then provided to electrical components to power the electrical components.

In some embodiments, the magnetic gearing 307 and the housing 308 each includes additional magnetic members (not shown) that surround the intermediate sleeve 319. In such embodiments, the combined magnetic flux of all of the members of the energy harvesting device 300 generates an electrical current in the stationary windings 318.

In operation, fluid flows downhole through the energy harvesting device 200 from a tool string that includes the energy harvesting device. The fluid flows through cavities 221 and 241 between the inner stator 244 and the outer stator 204 and exerts a hydraulic force onto the rotor 202. The direction and magnitude of the hydraulic force results generates kinetic energy in the rotor 202 by actuating the rotor 202 at the helical slot 212 and causing the rotor 202 to nutate such that the longitudinal rotor axis 260 rotates about the longitudinal stator axis 250. In some embodiments, the nutation of the rotor 202 includes a rotation motion and a rocking, swaying, or nodding motion along the longitudinal rotor axis 260. In other embodiments, the nutation of the rotor 202 includes only a rotation motion along the longitudinal rotor axis 260. The rotor 202 is coupled to a rotational component, such as an armature 206, which generates an electronic field across one or more windings 218 to generate an electric current in the windings. The electrical current, or electrical energy, may be routed to a battery or tool to power a nearby electrically-powered tool.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, an energy harvesting device, comprising: a stator having a first cavity formed therein; a rotor disposed within the first cavity, the rotor comprising a second cavity, at least one radial slot, and a helical slot extending from a first end of the rotor towards a second end of the rotor; an inner stator disposed within the second cavity, an armature adjacent to the rotor, the armature coupled to at least one winding coupled to an electrical component to provide an electrical current to power the electrical component; and a housing fixedly coupled to the outer stator, wherein the rotor is free to nutate between the inner stator and the outer stator.

Clause 2, the device of any combination of clauses 1 and 3-12, wherein a longitudinal rotor axis is parallel to and offset from a longitudinal stator axis.

Clause 3, the device of any combination of clauses 1, 2 and 4-12, wherein the rotor is operable to nutate such that the longitudinal rotor axis rotates about the longitudinal stator axis in response to fluid flow through the energy harvesting device.

Clause 4, the device of any combination of clauses 1-3 and 5-12, wherein the inner stator further comprises a helical winding, the helical winding wound at least one revolution around an outer surface of the inner stator.

Clause 5, the device of any combination of clauses 1-4, 6, 7, and 12, wherein the armature is coupled to the second end of the rotor and is rotatably mounted within the housing.

Clause 6, the device of any combination of clauses 1-5, 7, 8, and 12 wherein the armature comprises a generally cylindrical body and an eccentric cylindrical boss extending from a first end of the cylindrical body, the armature further comprising a cylindrical cavity extending through the cylindrical boss and the cylindrical body, the cylindrical cavity being concentric with the cylindrical boss, and wherein the armature is free to rotate within the housing.

Clause 7, the device of any combination of clauses 1-6, 8, and 12, further comprising a plurality of magnetic members aligned around an internal surface of the housing.

Clause 8, the device of any combination of clauses 1-7 and 12, wherein each magnetic member is adjacent a magnetic member having an opposite polarity.

Clause 9, the device of any combination of clauses 1-8 and 10-12, wherein the armature is stationary and is coupled to the housing.

Clause 10, the device of any combination of clauses 1-9, 11, and 12, further comprising a magnetic gearing, wherein the magnetic gearing is coupled to the second end of the rotor and is rotatably mounted within the housing, and wherein the magnetic gearing is free to rotate within the housing.

Clause 11, the device of any combination of clauses 1-10 and 12, wherein the magnetic gearing comprises a plurality of magnetic members aligned around a surface of the magnetic gearing, and wherein the plurality of magnetic members is operable to generate the electrical current in the at least one winding.

Clause 12, The device of any combination of clauses 1-11, wherein an amount of the electrical current generated is based on at least one of a flow rate of fluid flow through the energy harvesting device, a number of magnetic members disposed in the energy harvesting device, and a number of the at least one winding coupled to the armature.

Clause 13, a method to operate a downhole energy harvesting device, the method comprising: receiving a fluid within a cavity of a stator having a longitudinal stator axis, the stator having a rotor disposed within the cavity, the rotor being adjacent to an armature having at least one winding and being operable to nutate along a longitudinal rotor axis, the longitudinal rotor axis being an offset of the longitudinal stator axis; nutating the rotor along the longitudinal rotor axis to generate an electrical current in the at least one winding; and transmitting the electrical current to an electrical component coupled to a downhole generator to power the electrical component.

Clause 14, the method of any combination of clauses 13, 14, and 16, wherein the armature is rotatably coupled to the rotor and is rotatably mounted within a housing, the method further comprising rotating the armature along the longitudinal stator axis to generate the electrical current.

Clause 15, the method of any combination of clauses 13 and 14, wherein the rotor is rotatably coupled to a magnetic gearing having a plurality of magnetic members, and wherein the magnetic gearing is rotatably mounted within the housing, the method further comprising rotating the magnetic gearing along the longitudinal stator axis to generate the electrical current.

Clause 16, the method of any combination of clauses 13 and 14, wherein the rotor comprises at least one radial slot, and further comprising allowing drilling fluids flow through the at least one radial slots of the rotor.

Clause 17, a downhole power generating system, the system comprising: at least one electrical component; and an energy harvesting device electrically coupled to the at least one electrical component, the energy harvesting device comprising: an outer stator having a first cavity formed therein; a rotor disposed within the first cavity, the rotor comprising a second cavity, at least one radial slot, and a helical slot extending from a first end of the rotor towards a second end of the rotor; an inner stator disposed within the second cavity, an armature adjacent to the rotor, the armature coupled to at least one winding coupled to the at least one electrical component to provide an electrical current to power the at least one electrical component; and a housing fixedly coupled to the outer stator, wherein the armature is operable to generate the electrical current to power the at least one electrical component.

Clause 18, the system of any combination of clauses 17, 19, and 20, wherein a longitudinal rotor axis is parallel to and offset from a longitudinal stator axis, and wherein the rotor is operable to nutate such that the rotor longitudinal axis rotates about the longitudinal stator axis in response to fluid flow through the energy harvesting device.

Clause 19, the system of any combination of clauses 17 and 18, wherein the armature is coupled to the second end of the rotor and is rotatably mounted within the housing.

Clause 20, the system of any combination of clauses 17 and 18, wherein the armature is stationary and is coupled to the housing, and further comprising a magnetic gearing, wherein the magnetic gearing is coupled to the second end of the rotor and is rotatably mounted within the housing.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. An energy harvesting device, comprising:
    an outer stator having a first cavity formed therein;
    a rotor disposed within the first cavity, the rotor comprising a second cavity, at least one radial slot, and a helical slot extending from a first end of the rotor towards a second end of the rotor;
    an inner stator disposed within the second cavity;
    an armature adjacent to the rotor, the armature coupled to at least one winding coupled to an electrical component to provide an electrical current to power the electrical component; wherein the armature comprises a generally cylindrical body and an eccentric cylindrical boss extending from a first end of the cylindrical body, the armature further comprising a cylindrical cavity extending through the cylindrical boss and the cylindrical body, the cylindrical cavity being concentric with the cylindrical boss;
    a housing fixedly coupled to the outer stator, wherein the rotor is free to nutate between the inner stator and the outer stator; wherein the armature is coupled to the second end of the rotor and is rotatably mounted within the housing; wherein the armature is free to rotate within the housing; and
    a plurality of magnetic members aligned around an internal surface of the housing.

2. The device of claim 1, wherein a longitudinal rotor axis is parallel to and offset from a longitudinal stator axis.

3. The device of claim 2, wherein the rotor is operable to nutate such that the longitudinal rotor axis rotates about the longitudinal stator axis in response to fluid flow through the energy harvesting device.

4. The device of claim 1, wherein the inner stator further comprises a helical winding, the helical winding wound at least one revolution around an outer surface of the inner stator.

5. The device of claim 1, wherein each magnetic member is adjacent to a magnetic member having an opposite polarity.

6. The device of claim 1, wherein the armature is stationary and is coupled to the housing.

7. The device of claim 6, further comprising a magnetic gearing, wherein the magnetic gearing is coupled to the second end of the rotor and is rotatably mounted within the housing, and wherein the magnetic gearing is free to rotate within the housing.

8. The device of claim 7, wherein the magnetic gearing comprises a plurality of magnetic members aligned around a surface of the magnetic gearing, and wherein the plurality of magnetic members is operable to generate the electrical current in the at least one winding.

9. The device of claim 1, wherein an amount of the electrical current generated is based on at least one of a flow rate of fluid flow through the energy harvesting device, a number of magnetic members disposed in the energy harvesting device, and a number of the at least one winding coupled to the armature.

10. A method to operate a downhole energy harvesting device, the method comprising:
    receiving a fluid within a cavity of a stator having a longitudinal stator axis, the stator having a rotor disposed within the cavity, the rotor being adjacent to an armature having at least one winding and being operable to nutate along a longitudinal rotor axis, the longitudinal rotor axis being an offset of the longitudinal stator axis;
    nutating the rotor along the longitudinal rotor axis to generate an electrical current in the at least one winding; and transmitting the electrical current to an electrical component coupled to a downhole generator to power the electrical component;

wherein the rotor is rotatably coupled to a magnetic gearing having a plurality of magnetic members, and wherein the magnetic gearing is rotatably mounted within a housing; and rotating the magnetic gearing along the longitudinal stator axis to generate the electrical current.

11. The method of claim 10, wherein the armature is rotatably coupled to the rotor and is rotatably mounted within a housing, the method further comprising rotating the armature along the longitudinal stator axis to generate the electrical current.

12. The method of claim 10, wherein the rotor comprises at least one radial slot, and further comprising allowing drilling fluid through the at least one radial slots of the rotor.

13. A downhole power generating system, the system comprising:

at least one electrical component; and an energy harvesting device electrically coupled to the at least one electrical component, the energy harvesting device comprising:

an outer stator having a first cavity formed therein;

a rotor disposed within the first cavity, the rotor comprising a second cavity, at least one radial slot, and a helical slot extending from a first end of the rotor towards a second end of the rotor;

an inner stator disposed within the second cavity;

an armature adjacent to the rotor, the armature coupled to at least one winding coupled to the at least one electrical component to provide an electrical current to power the at least one electrical component; and a housing fixedly coupled to the outer stator; wherein the rotor is free to nutate between the inner stator and the outer stator; wherein the armature is stationary and is coupled to the housing;

a magnetic gearing, wherein the magnetic gearing is coupled to the second end of the rotor and is rotatably mounted within the housing, and wherein the magnetic gearing is free to rotate within the housing; wherein the magnetic gearing comprises a plurality of magnetic members aligned around a surface of the magnetic gearing, and wherein the plurality of magnetic members is operable to generate the electrical current in the at least one winding; and wherein the armature is operable to generate the electrical current to power the at least one electrical component.

14. The system of claim 13, wherein a longitudinal rotor axis is parallel to and offset from a longitudinal stator axis, and wherein the rotor is operable to nutate such that the longitudinal rotor axis rotates about the longitudinal stator axis in response to fluid flow through the energy harvesting device.

15. The system of claim 14, wherein the armature is coupled to the second end of the rotor and is rotatably mounted within the housing.

* * * * *